(12) United States Patent
Mucciacciaro et al.

(10) Patent No.: US 6,308,903 B1
(45) Date of Patent: Oct. 30, 2001

(54) CENTRIFUGAL TIRE RUBBER AND STEEL SEPARATION

(75) Inventors: Domenic Mucciacciaro, 1791 Blount Rd., Ste. 901 Boca Raton, FL (US) 33069; Alvin S. Blum, Fort Lauderdale, FL (US)

(73) Assignee: Domenic Mucciacciaro, Boca Raton, FL (US)

( * ) Notice: Subject to any disclaimer, the term of this patent is extended or adjusted under 35 U.S.C. 154(b) by 0 days.

(21) Appl. No.: 09/449,952

(22) Filed: Nov. 29, 1999

(51) Int. Cl.⁷ .................................................. B02C 19/12
(52) U.S. Cl. .............................. 241/3; 241/23; 241/24.13; 241/24.17; 241/65; 241/101.4; 241/DIG. 31
(58) Field of Search .................................. 241/23, 24.13, 241/24.14, 24.17, DIG. 31, 65, 3, 101.4

(56) References Cited

U.S. PATENT DOCUMENTS

| | | |
|---|---|---|
| 5,115,983 | 5/1992 | Rutherford .................. 241/DIG. 31 |
| 5,272,937 | 12/1993 | Brosowske . |
| 5,482,215 | 1/1996 | Veres ............................. 241/DIG. 31 |
| 5,683,038 | 11/1997 | Shinal .......................... 241/DIG. 31 |
| 5,715,731 | 2/1998 | Koch . |
| 5,794,861 | 8/1998 | Rutherford ................... 241/DIG. 31 |
| 5,894,997 | 4/1999 | Chen ............................ 241/DIG. 31 |
| 5,904,305 | 5/1999 | Kaczmarek ................. 241/DIG. 31 |
| 5,924,637 | 7/1999 | Niederholtmeyer ......... 241/DIG. 31 |

*Primary Examiner*—Mark Resenbaum
(74) *Attorney, Agent, or Firm*—Alvin S. Blum

(57) ABSTRACT

Apparatus and method for processing used vehicle tires that separates the steel metal from the rubber and other non-metallic materials for recycling. The tire is rotated at sufficient speed to force the materials outwardly by centrifugal force. Heated blades move centripetally to melt and cut through the non-metallic materials, dividing the tire into at least two arcs that are held together by the steel reinforcement that is not easily cut through. Electric heating apparatus heats the steel more than the rubber so that the forces binding the rubber are released, enabling the rubber and other non-metallic materials to be flung outwardly away from the steel. The steel is then collected separately. The differential heating apparatus may be inductive or resistive.

14 Claims, 6 Drawing Sheets

CENTRIFUGAL TIRE RUBBER AND STEEL SEPARATION

BACKGROUND OF THE INVENTION

This invention relates to used tires recycling and more specifically to method and apparatus for separation of the steel in used tires from the rubber and other non-steel materials for enhanced utilization of the recycled materials.

DESCRIPTION OF THE PRIOR ART

When tires are so worn that they are no longer useful on vehicles, they retain all of their steel content and much of their rubber. It is very costly to dispose of them. They are persistent in the environment, and present a serious fire hazard. Vehicle tires are composed primarily of rubber mixed with carbon black. They have belts at the tread composed of fine steel wires and some cords and belts of polyester plastic, rayon, or other non-metallic fibers. At the rim portion, heavy steel wire or rod is embedded in the rubber. The steel and rubber could be put to good use if an economical method could be found to separate them from one another. Methods have been proposed for grinding or cutting the tires into small pieces and then using magnets to pull out the steel. However the tire is very tough. It resists cutting and grinding. Some methods involve freezing to a very low temperature and then grinding the brittle mass before separation by flotation or magnet. These methods have not enjoyed much commercial success.

SUMMARY OF THE INVENTION

It is accordingly, an object of the invention to provide apparatus and method for separation of steel from the other components of used tires that is cost effective and useful. The method of the invention comprises rotating the tire about its center while moving heated blades radially and centripetally to cut and/or melt the tire rubber and non metal materials into at least two arcuate portions. At the same time, the steel is differentially heated so that it will soften or melt any rubber or plastic in contact with it, to release the rubber and permit the rubber to be flung out centrifugally, free of constraints from the steel. This leaves the steel rotating and free of rubber. This steel is then pushed off of the rotating apparatus by an axially moving stripper apparatus. Alternative methods for differentially heating the steel include inductive heating and resistive heating by application of electric current to the steel. The apparatus may include automatic dynamic balancing means well known in the rotary apparatus art. The heated blades may move centripetally by either pivotal or translatory motion.

DETAILED DESCRIPTION OF PREFERRED EMBODIMENTS

Figure 1:
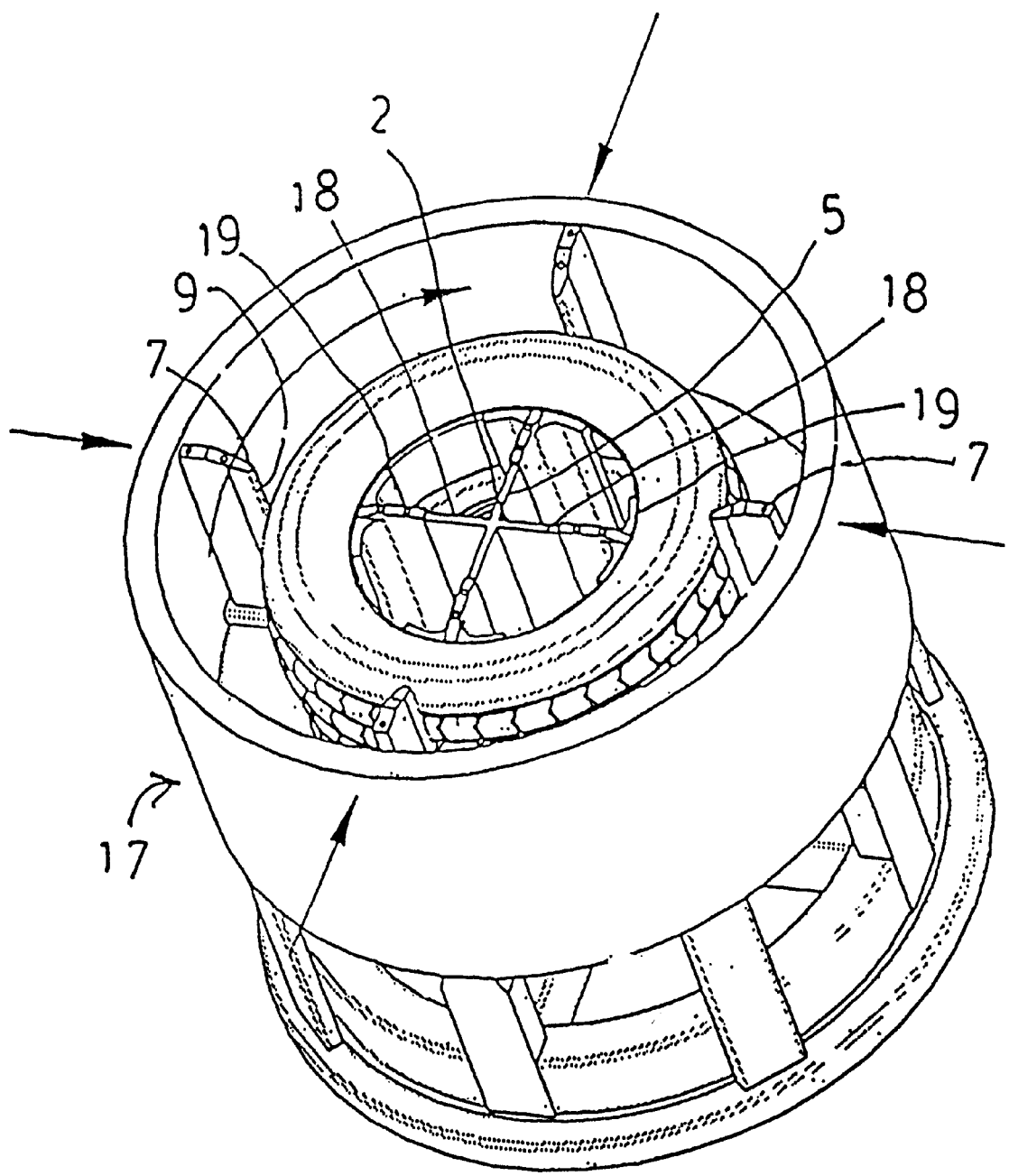
FIG. 1 is a perspective view of a separation apparatus of the invention with tire in place before blades move inward.
Figure 2:
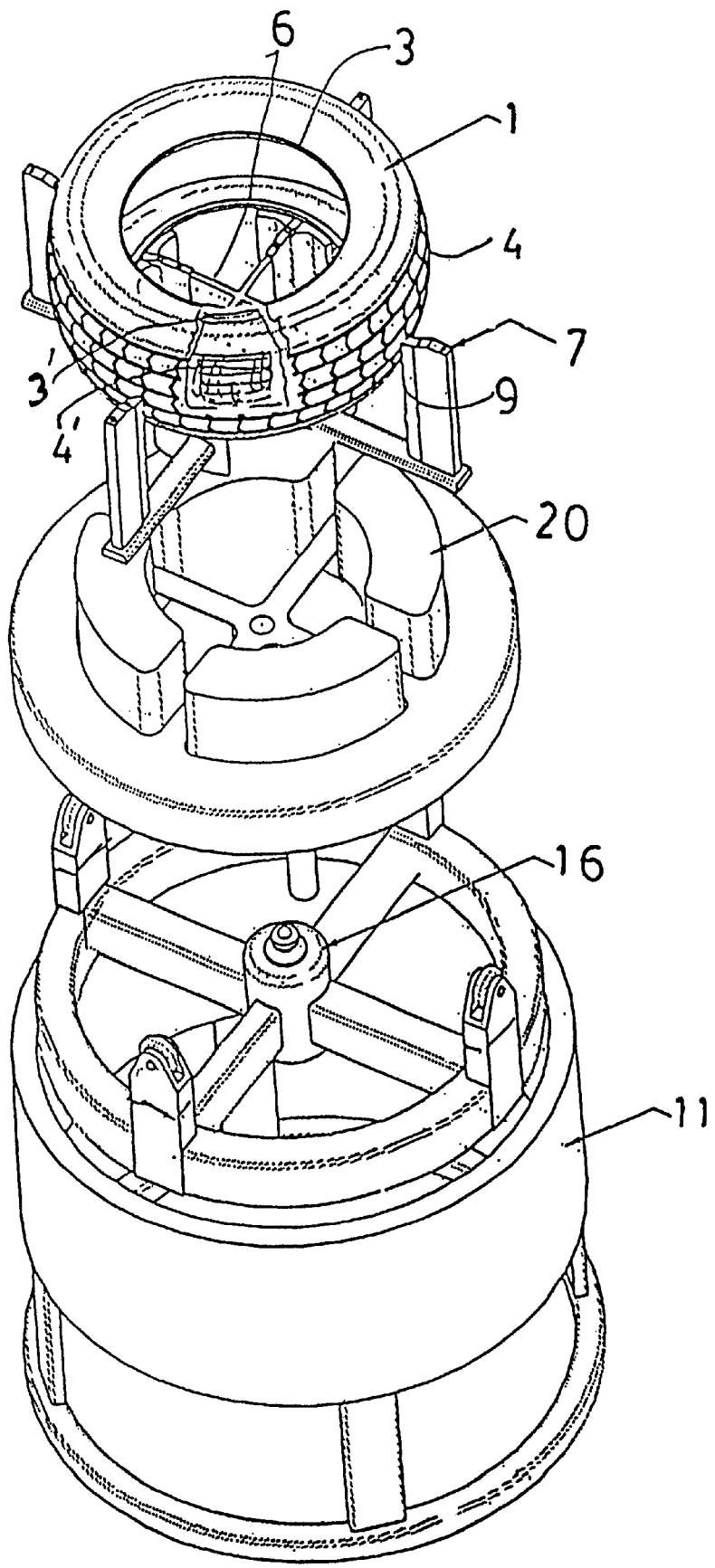
FIG. 2 is an exploded perspective view of the apparatus of FIG. 1.
Figure 3:
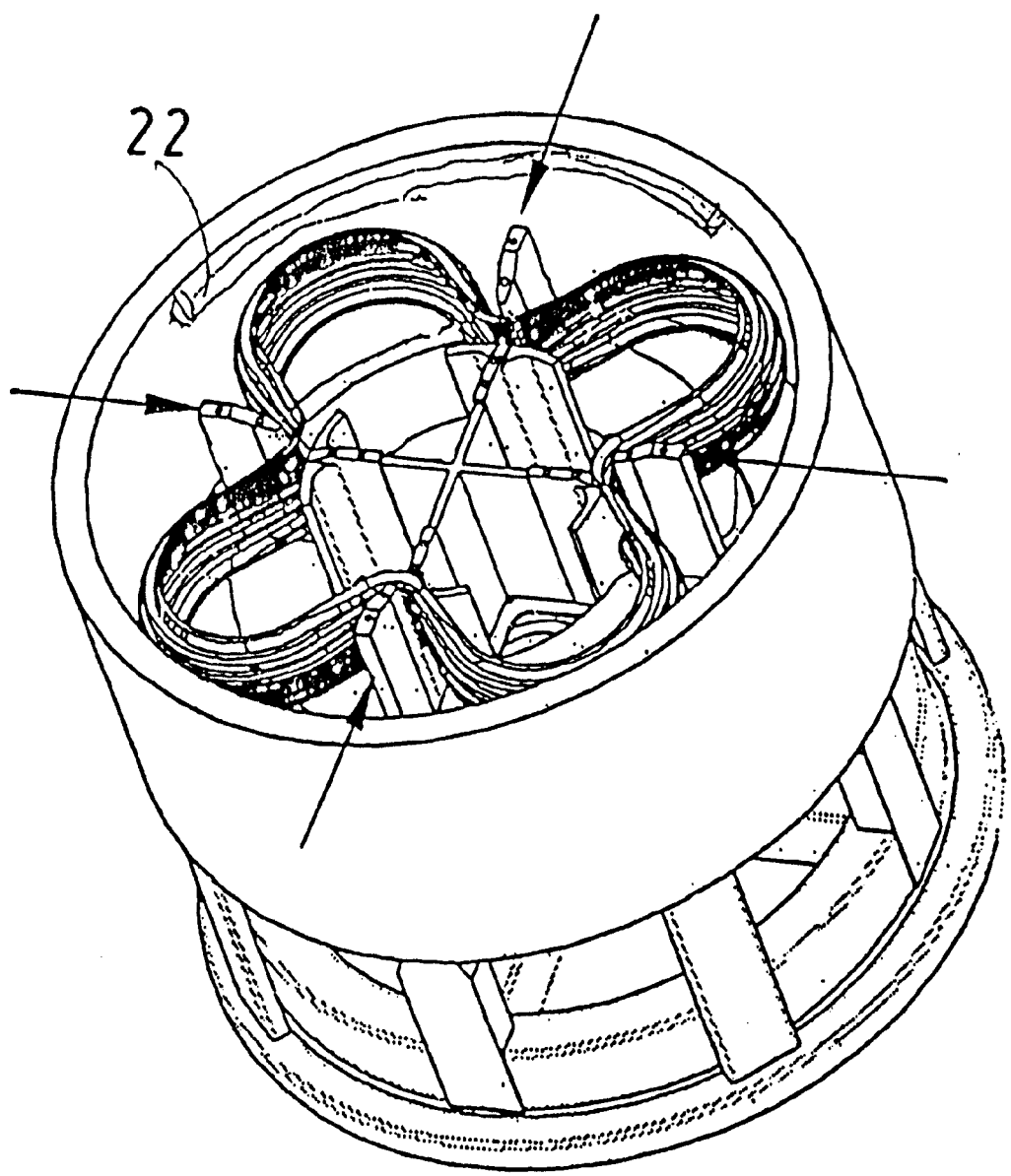
FIG. 3 is a perspective view of the apparatus of FIG. 1 with blades all the way in after rubber has been flung off the steel.
Figure 4:
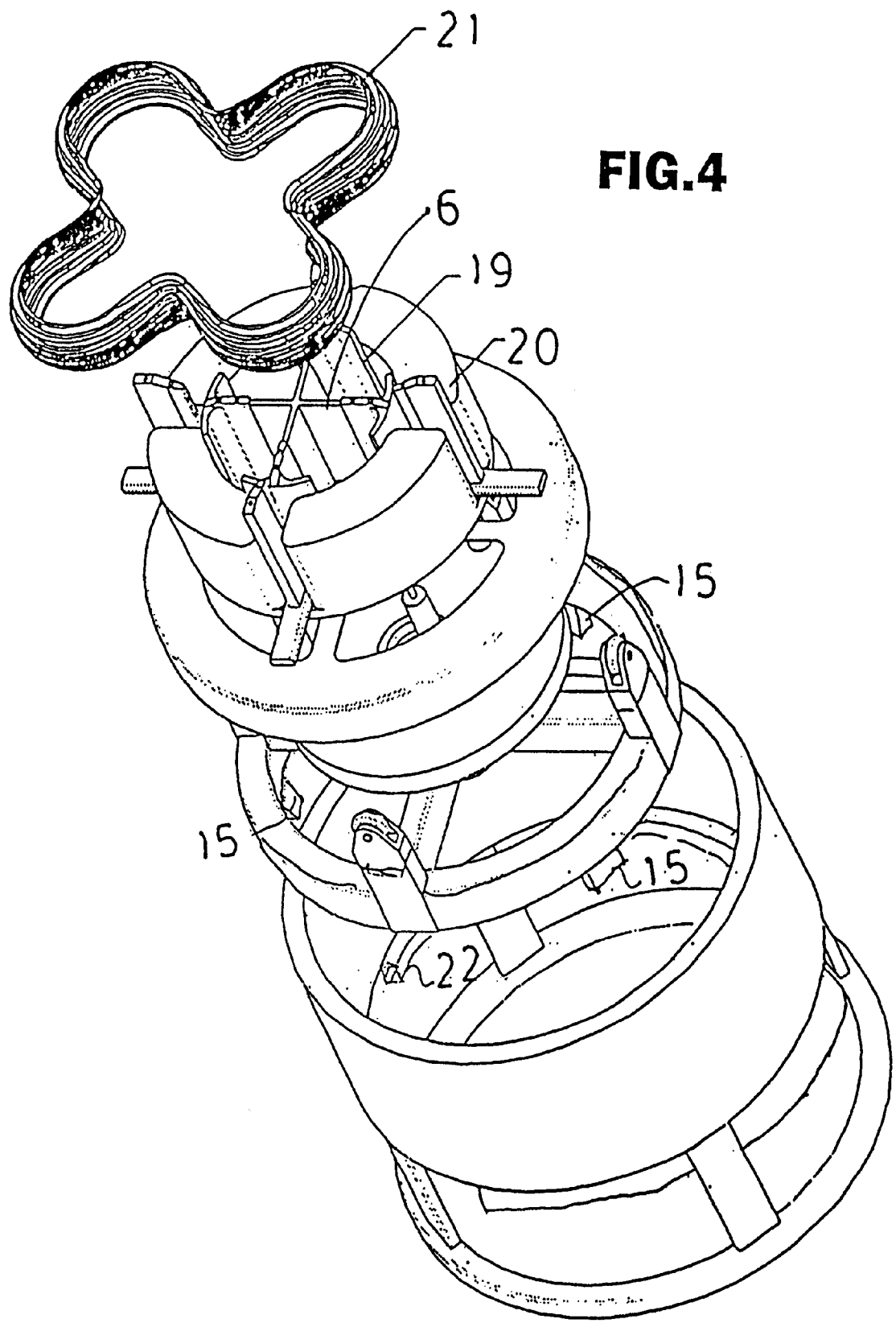
FIG. 4 is an exploded perspective view of the apparatus of FIG. 3 with the stripper plates elevated to dispose of the steel, and scraper ring lowered to dispose of the rubber.

Referring now first to FIGS. 1–4, a conventional vehicle tire 1 has an inner bead 3 in which is embedded a heavy steel wire 3', an outer perimeter 4 with one or more belts 4' of rubber-coated plastic or steel beneath the outer tread. The apparatus 17 of the invention includes an engaging means 6 comprising cross arms 18 which may be adjusted to closely approximate the inner diameter of the tire. Each arm terminates in broad element 19, which serves as an anvil, as blade 7 forces the tire against it. Blades 7 have an electrically heated edge 9 to enable the blade to melt and cut through the rubber and the non-metallic belts. Slip rings that provide electric power to the blade heaters are conventional and well known in the art, and are not shown. An electric motor 16 rotates the engaging means 6 and the blades along with the stripper plate 20 at sufficient speed to generate centrifugal force to force the rubber outward. Because all of these elements rotate in concert with the tire, the forces on the tire are limited to centrifugal force, cutting force, and heating. The cutting action of the blades will therefor not inhibit tire rotation. The apparatus may be provided with automatic dynamic balancing elements 15 that may be any of the many types well known in the art that need not be detailed here. The blades are forced inwardly from the position shown in FIG. 1 to the position shown in FIG. 3 in a translatory motion as the tire rotates to melt and cut through the rubber and the non-metallic materials so that only the steel is preventing the rubber from being flung outwardly. A stationary annular cylindrical electrically powered induction coil 11 surrounds the tire and generates an alternating magnetic field in the steel so that it becomes hotter than the rest of the tire. The rubber and non-metallic fibers are no longer held in place by the hot steel. Everything but the steel is flung outwardly by the centrifugal force, leaving the steel behind. The stripper plate 20 is then elevated as shown in FIG. 4 to strip the steel 21 off the rotating elements. Scraper ring 22 is lowered from position shown in FIG. 3 to position shown in FIG. 4 to push the centrifugally separated materials from the inner wall of the coil for recycling.

Figure 5:
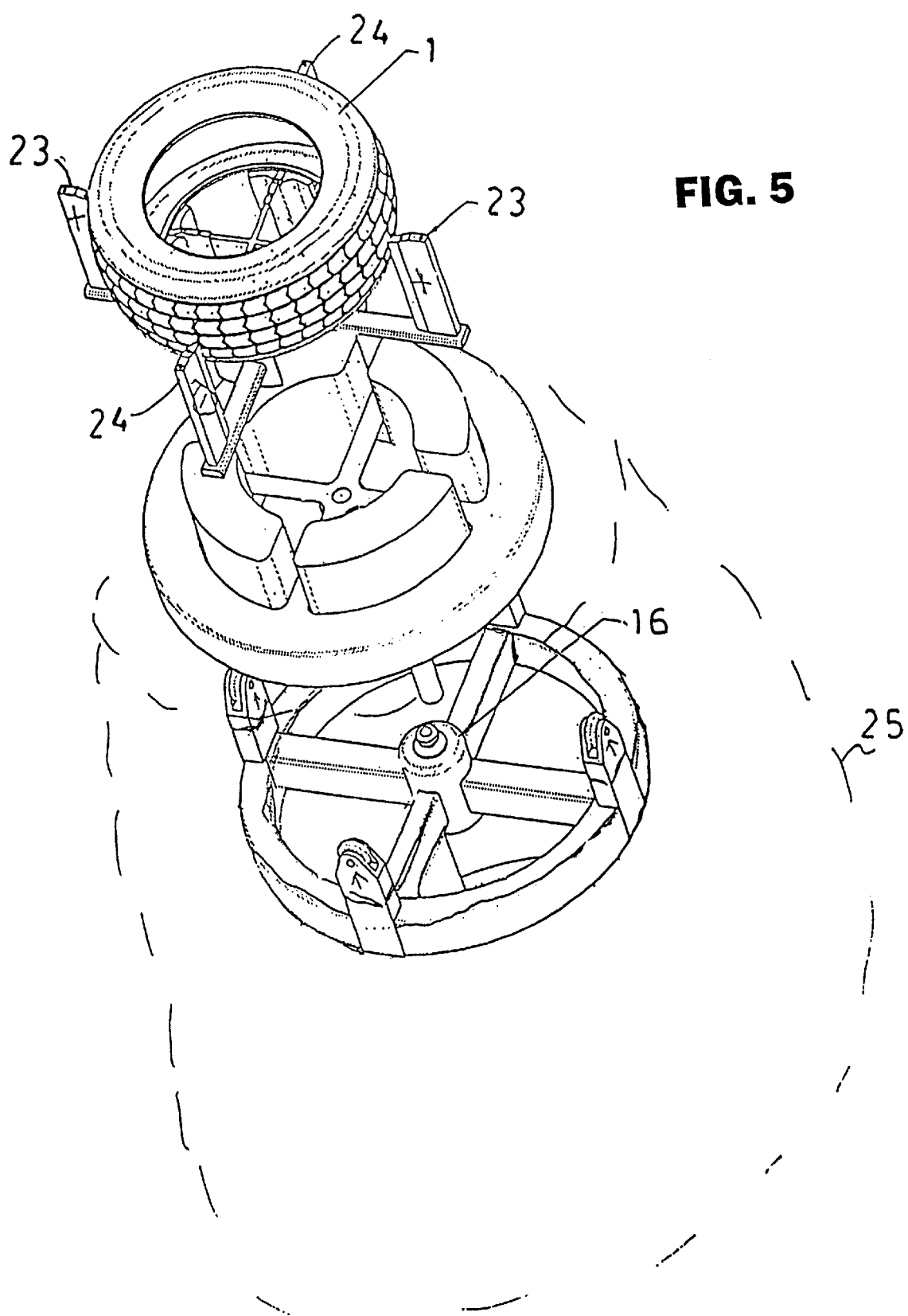
FIG. 5 is an exploded perspective view of another embodiment of the invention.

Referring now to FIG. 5, another embodiment of the invention comprises an alternative mechanism for differentially heating the steel that employs resistive heating. Blades 23 are positively charged and blades 24 are negatively charged by a large direct current. As the blades contact the steel within the tire, electric current passes between the oppositely charged blades through the steel. The steel is heated by passage of the current, while less electric energy is dissipated and wasted in the rubber. Optionally, the anvils 19 may also be electrically charged, and may present a sharpened edge to meet the blade, so that the tire is penetrated from its inner and outer surfaces. A cylindrical shell 25, shown in phantom, spaced away from the rotating members, catches the non-metallic material as it is thrown from the steel by the centrifugal force.

Figure 6:
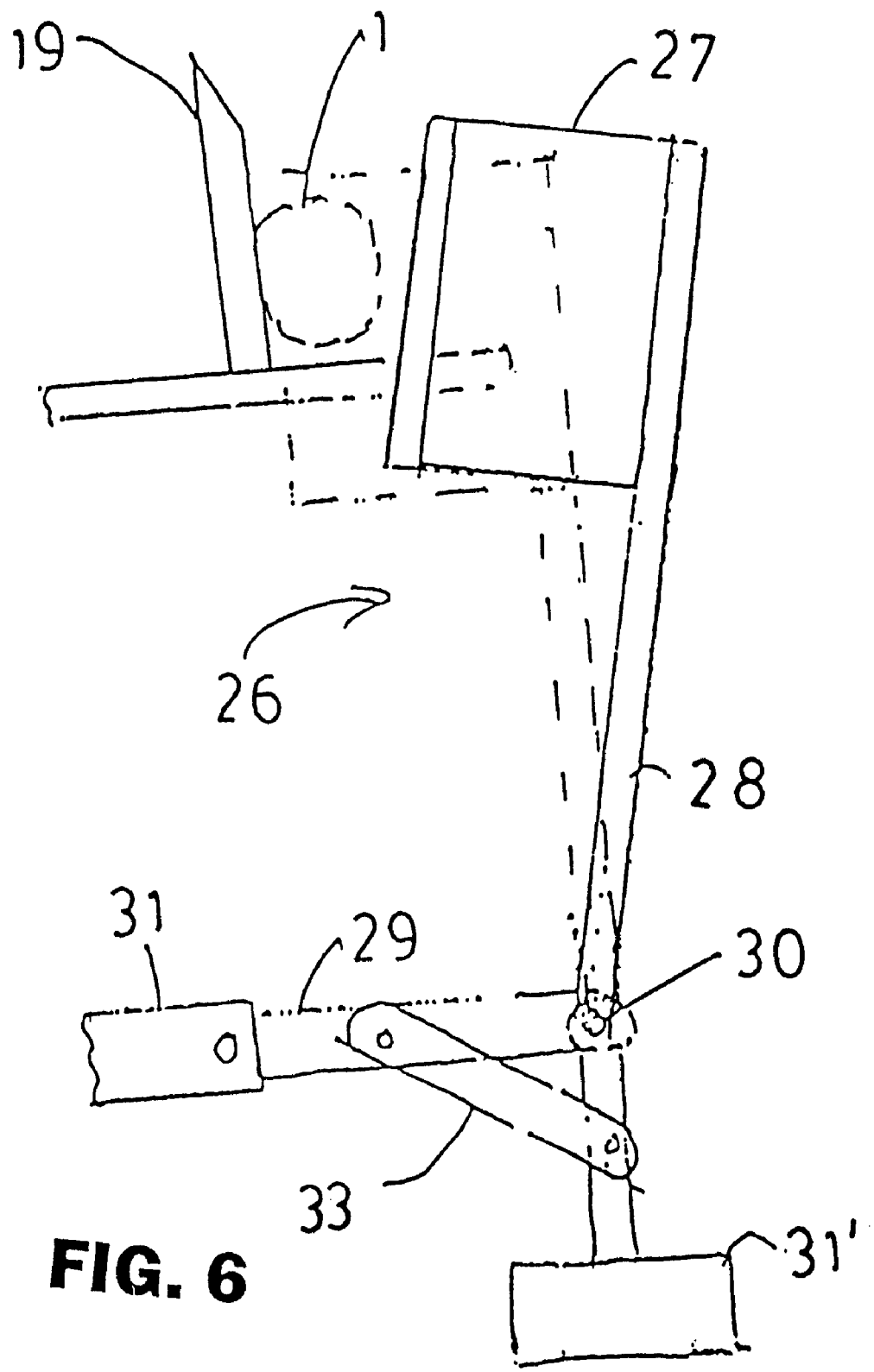
FIG. 6 is a detail view of the blade movement mechanism of another embodiment of the invention.

Referring now to FIG. 6, another mechanism 26 for forcing the blade 27 into the tire 1 is shown that supports the blade on arm 28 that is pivotally attached to rotating horizontal member at pivot 30. The length of member 29 may be adjusted by hydraulic piston 31 for tires of different sizes. A counter weight 31' may be greater in mass than the blade so that centrifugal force tends to drive the blade inwardly. Hydraulic piston 33 also drives the blade into the tire. The translatory blade driving mechanism of the apparatus of FIGS. 1–4 employs a hydraulic piston similar to piston 31 to drive the blade into the tire.

The above disclosed invention has a number of particular features which should preferably be employed in combination, although each is useful separately without departure from the scope of the invention. While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A method of separating steel metal from non-metallic materials in a tire having a center, the method comprising:

rotating the tire about the center;

cutting through the non-metallic materials of the tire with at least two centripetally moving heated blade elements;

differentially heating the steel metal of the tire to enable the non-metallic materials to move centrifugally away from constraint by the steel metal;

centrifugally moving the non-metallic materials away from the steel metal;

collecting the centrifugally moved non-metallic materials away from the steel metal; and collecting the steel metal away from the non-metallic materials.

2. The method according to claim 1, in which the differentially heating is by electrical induction heating.

3. The method according to claim 1, in which the differentially heating is by electrical resistive heating.

4. The method according to claim 1, further comprising dynamically balancing the rotating tire by automatic balancing means.

5. Apparatus for separation of steel metal from non-metallic materials in a tire having a center of rotation, an inner rim, and an outer perimeter, the apparatus comprising:

a) rotating and engagement means for engaging the inner rim and rotating the tire about the center;

b) at least two heated blades mounted for rotational motion in concert with the rotating and engagement means and also provided with controlled radial motion between a first position outside of the outer perimeter and a second position pressing the inner rim against the engagement means, the radial motion being controlled by radial motion control means and enabling the blades to cut through the non-metallic materials during a centripetal motion;

c) differential heating means for heating the steel metal to a higher temperature than the non-metallic materials of the tire during rotation to such a temperature that the forces binding the non-metallic materials to the steel are released, thereby enabling the non-metallic materials to escape centrifugally from the steel metal.

6. The apparatus according to claim 5, in which the differential heating means is electrically inductive heating.

7. The apparatus according to claim 6, in which the blades are pivotally mounted for radial motion.

8. The apparatus according to claim 6, in which the blades are translationally mounted for radial motion.

9. The apparatus according to claim 5, in which the differential heating means is electrically resistive heating.

10. The apparatus according to claim 7, in which the blades are pivotally mounted for radial motion.

11. The apparatus according to claim 7, in which the blades are translationally mounted for radial motion.

12. The apparatus according to claim 5, in which the blades are pivotally mounted for radial motion.

13. The apparatus according to claim 5, in which the blades are translationally mounted for radial motion.

14. The apparatus according to claim 5, further comprising automatic dynamic balancing means attached to the rotating and engaging means for balancing the tire during rotation.

* * * * *